Nov. 24, 1953 R. C. DEHMEL 2,660,720

SIMULATED RADIO SIGNAL APPARATUS

Filed Sept. 22, 1950 2 Sheets-Sheet 1

INVENTOR.
RICHARD C. DEHMEL by Orin R. Severn his ATTORNEY

INVENTOR.
RICHARD C. DEHMEL
by Orin R. Severn
his ATTORNEY

Patented Nov. 24, 1953 | 2,660,720

UNITED STATES PATENT OFFICE 2,660,720

SIMULATED RADIO SIGNAL APPARATUS

Richard C. Dehmel, Short Hills, N. J.

Application September 22, 1950, Serial No. 186,200

12 Claims. (Cl. 340—348)

This invention relates to simulated radio signal apparatus for radio navigation instruction, and particularly to means used in connection with grounded aircraft trainers for simulating the identification signals of radio range stations.

The radio range signals of a multiple beam system in general use include not only the "A" and "N" quadrant signals but also the call letters in code of the particular transmitting station, the latter being transmitted twice within a definite time period which is limited to about 7½ seconds. It is therefore apparent that a station having a long identification signal involving call letters such as "J" or "P" for example must transmit the signal at a higher rate than a station having a short signal including letters such as "E" or "T" in order properly to fit into the time alotted for the double identification signal.

Heretofore this has been done in simulated radio navigation apparatus by using a specially machined fiber cam for representing each radio range station, the cam contour being designed for operating signal circuit contacts according to the dot-and-dash identification signal. However, this arrangement is not only expensive and time consuming in respect to production but is inconvenient in practice since a training program often involves simulation of a considerable number of radio stations requiring stocking of a corresponding number of cams. When new stations are to be added by the instructor to the navigation problem, the keyer and hence the training apparatus must be shut down so that the unused cams can be removed and the substituted cams properly secured and adjusted to the keyer shaft. Also further delay may be incurred in the machining of a new cam in case of damage to or loss of a particular cam.

A principal object of this invention therefore is to provide improved keyer apparatus for simulating radio signals that is simple in both construction and operation and that is readily adaptable for changing the call letters used to identify respective radio range stations.

In accordance with the present invention, the above-described disadvantages of the prior art are overcome and the simulation of an indefinite number of radio stations is expedited and simplified by using a flexible, perforated paper or fiber insulating strip representing a particular station to control contacts of a respective signal circuit. The keyer is provided with graduated means to which the aforesaid strip may be selectively applied for properly proportioning the identification signal within the call-letter interval so that neither undue crowding of the signal nor long silent intervals are involved. The paper strips can be readily punched as required for the radio station by the instructor so that an indefinite number of stations may be represented by the keyer without complication or delay.

The invention will be more fully set forth in the following description referring to the accompanying drawings, and the features of novelty will be pointed out with particularity in the claims annexed to and forming a part of this specification.

Referring to the drawings.

The keyer apparatus of the present invention is intended to be used with grounded flight training apparatus such as of the character disclosed in my Patent No. 2,366,603 granted January 2, 1945, for "Aircraft Training Apparatus," wherein the student pilot is provided with headphones for receiving simulated radio range signals, including the usual A and N quadrant signals, radio station identification signals, fan marker and instrument landing signals, etc. To identify the particular range in which a flight is conducted, the A and N signal sequence is interrupted after each 12 successive transmittals to project station identifying signals first in the N pair of quadrants and then in the A quadrants. The complete cycle requires about 37½ seconds. Of this period, 30 seconds are used for the A and N signals and 7½ seconds are used for the station signals. The present invention is concerned primarily with that part of the keyer apparatus for simulating the station code transmittals.

Figure 1:
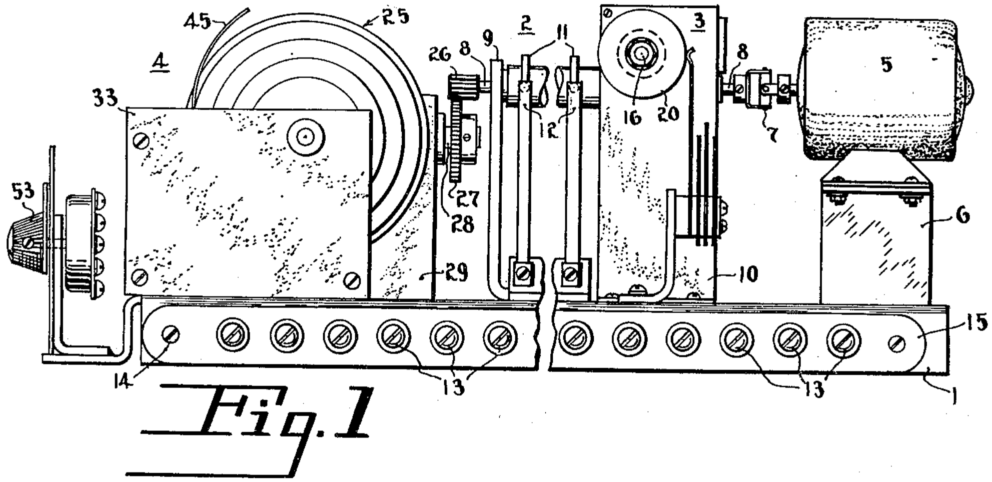
Fig. 1 is a side view of a keyer assembly partly broken away, to which the present invention is applied.
Figures 2, 3, 4:
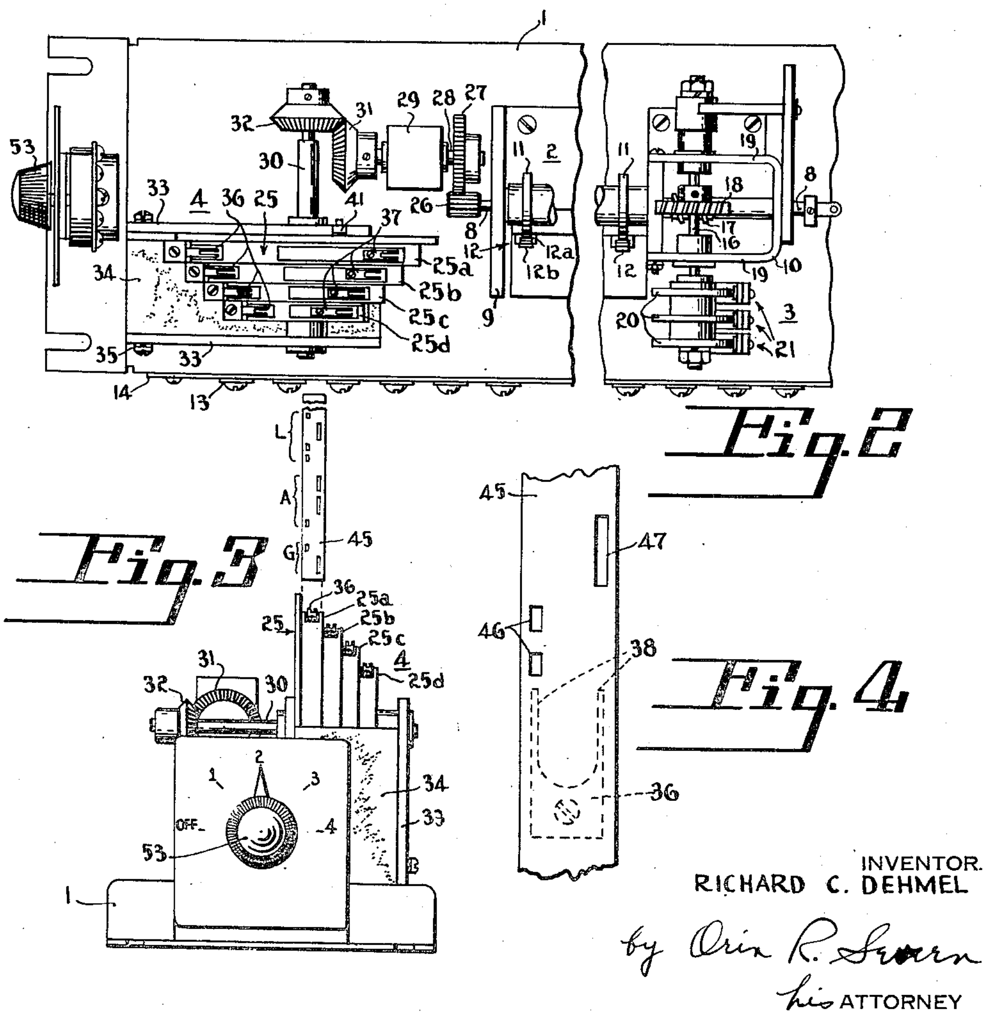
Fig. 2 is a top view of part of the keyer assembly shown by Fig. 1.
Fig. 3 is an end view of the keyer assembly illustrating the keyer drum and station selector switch.
Fig. 4 is a detail view illustrating the perforated strip and brush contact construction.

Referring to Figs. 1 and 2, the keyer assembly comprises a base plate 1 on which are mounted two groups of signal circuit controlling cams generally indicated at 2 and 3 respectively, a station identification signal coding unit generally indicated at 4 and a constant speed motor 5 for driving the aforesaid cams and station coding unit. The motor 5 is suitably mounted on a bracket 6 secured to the base 1 and is connected through a universal coupling 7 to the main cam shaft 8. This shaft is mounted on spaced bearing supports 9 and 10 which are suitably secured to the base and has mounted thereon the individual cams 11 of cam group 2. These cams can be the usual A and N keying, fan marker and instrument landing cams hereinafter referred to and diagrammatically indicated in Fig. 6. The present invention is not concerned with the specific contour of these cams and it is sufficient to state that the cams control respective spring switches 12 that in turn are electrically connected by conductors (not shown) to corresponding terminals 13 of terminal panels 14 and 15 secured to a side of the base 1. As diagrammatically indicated in Fig. 6, a respective cam may in certain cases operate a spring contact 12*a* into alternate engagement with fixed contacts 12*b* for controlling a signal circuit. In other cases a single fixed contact is sufficient.

The cam group 3 is operated from a counter shaft 16 that is driven from the main shaft 8 through a worm gear 17 on the main shaft and a coacting gear 18 secured to the counter shaft, the gearing having a 15:1 ratio. The counter shaft 16 is journaled in the side flanges 19 of the U-shaped bearing support 10 and has mounted thereon individual cams 20 for operating respective signal circuit switches 21 of the character above described. The cams 20 may represent "anti-key click," "range identification transfer" and "identification range selector" respectively as diagrammatically indicated in Fig. 6.

The code unit 4 for the station identification signals comprises a stepped drum 25 of conducting material that is driven from the main cam shaft 8 through a pinion gear 26 and a coacting gear 27 that is secured to a short counter shaft 28 journaled in a bearing support 29, Fig. 2. The counter shaft 28 is connected to the drum shaft 30 through bevel gears 31 and 32, the gear ratio of the aforesaid drive being selected with respect to the motor speed and the A and N cams so that the drum makes a complete revolution in about twice the time required for station identification signals or about ⅓ the speed of cam shaft 8. The drum shaft is journaled in vertical bearing plates 33 suitably secured to the base. An insulating block 34 is clamped by means of a throughbolt 35 between the bearing plates and is stepped so as to correspond closely with the arcuate stepped portions of the metal drum 25 as best shown in Fig. 2.

Figures 5, 6:
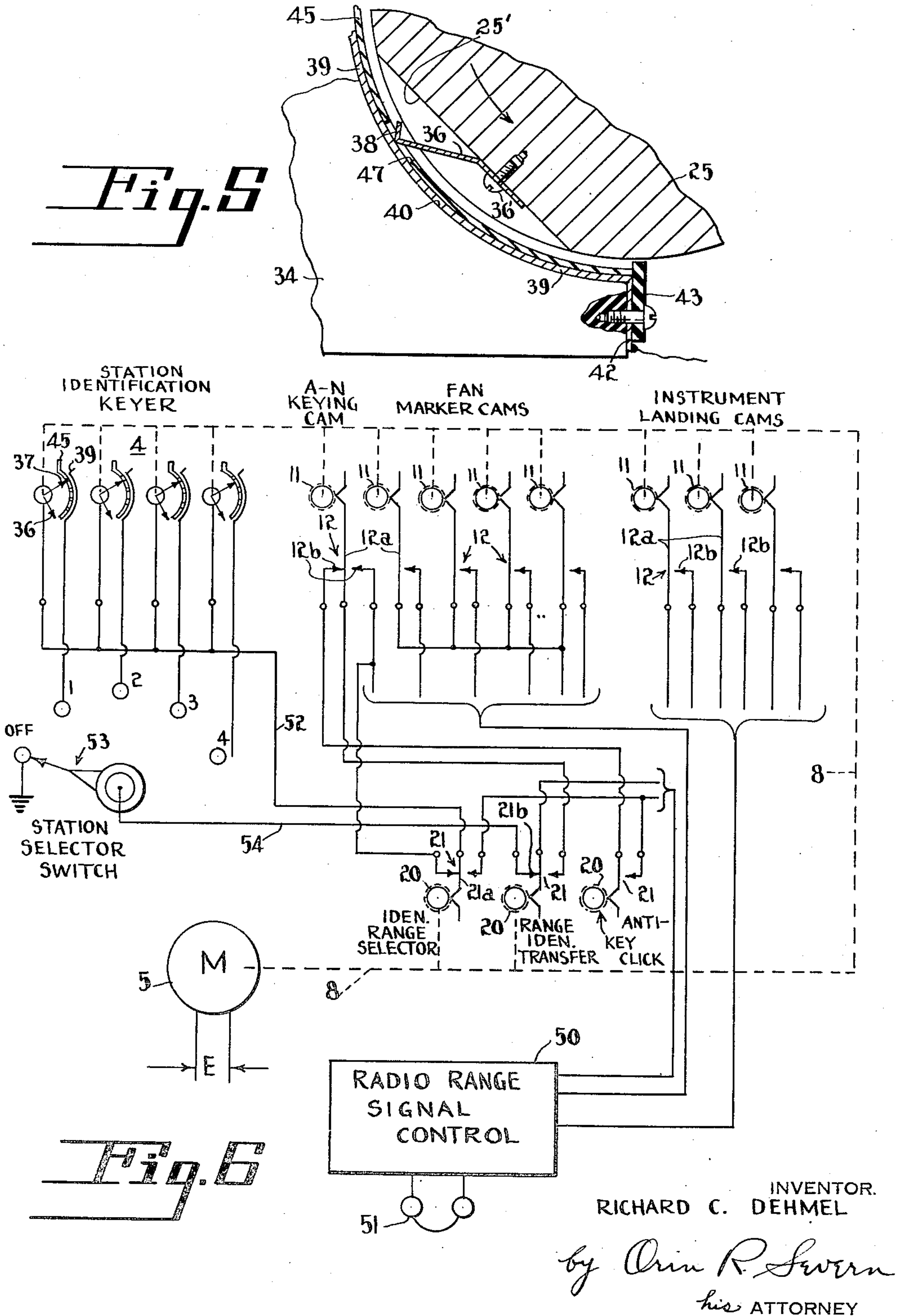
Fig. 5 is a detail view with spacing somewhat exaggerated illustrating the operation of the drum brush contacts and the perforated code strip.
Fig. 6 is a circuit diagram illustrating keyer circuits for the various radio range signals.

Referring specifically to the drum 25 which constitutes the movable element of the coding unit, a plurality of stepped portions, specifically four in number as shown, are formed along the axis of rotation of the drum. The stepped portions designated 25*a*, 25*b*, 25*c* and 25*d* are of decreasing diameter as illustrated in Figs. 2 and 3 and rotate within corresponding arcuate grooved steps in the insulating block 34. As best shown in Figs. 2, 3 and 5, each drum step is provided with two brush contacts 36 and 37 spaced approximately 106° apart on the periphery of the respective step and each brush comprises a pair of resilient contact prongs 38, Fig. 4, arranged to make wiping contact with an arcuate fixed contact 39 which is secured to the insulating block 34 and extends along the respective block groove 40 as illustrated by Fig. 5. The brushes are connected directly to the drum, as by screws 36', Fig. 5, so as to be in electrical contact therewith. For proper mounting of each brush contact, the respective drum step has a small peripheral segmental notch 25', Figs. 3 and 5, so that the brush sets mainly within the step except for the bent contact portions of the brush prongs 38.

Circuit conductors can be suitably connected to the rotatable drum 25 and the coacting fixed arcuate contact 39, as for example at the fixed brush contact 41, Fig. 2, that is mounted in the bearing support 33 for wiping engagement with the large diameter end of the drum, and at the terminal portion 42, Fig. 5, at the lower end of the arcuate contact.

In the arrangement so far described, the brushes of the drum, which is rotated in a counterclockwise direction, simply make wiping contact engagement with the arcuate fixed contact 39. The coaction of the drum contacts or brushes 36 and 37 and the arcuate contact 39 which form respectively the movable and fixed elements of a circuit breaker is controlled by a perforated paper or fiber strip 45, Figs. 3, 4 and 5, that is inserted within the peripheral space between a respective drum section and its corresponding arcuate contact so that the various perforations of the strip are in alignment with either one or the other prong of the corresponding drum contact. For improved operation, the strip 45 is perforated with the dots 46 extending along one edge and the dashes 47 extending along the opposite edge. With this arrangement one prong of each brush controls the dot signals and the other prong of that brush controls the dash signals whereby rapid transmission of signals is possible without blurring or skipping of individual signals. The arrangement is such that as the leading brush 36 wipes the perforated strip 45 in counterclockwise rotation, Fig. 5, a circuit is made between one brush prong or the other and the arcuate contact 39 through the strip perforations representing the dots and dashes of the station code letters for corresponding intervals. When the leading brush reaches the bottom and completes the circuit controlling operation for all letters of the station (specifically illustrated "LGA") the following brush after an appropriate interval repeats the signal according to standard practice so that the double identification signal is completed in approximately a half revolution of the drum. The circuit so established can control in suitable manner, for example according to my Patent 2,366,603 above referred to, the output of an oscillator connected to the student's headphones so that the student hears signals similar to radio signals used in practice.

During a training program, the instructor simply punches by any suitable means a strip 45 to correspond to the station signal that is being simulated. In accordance with standard practice, a dot is represented by one unit of length and a dash by three units. For spacing, one unit separates the dots and dashes of each letter and three units separate the respective letters. The strip is punched uniformly as to length units for all stations and is trimmed near the end of the last letter.

After the strip has been punched to represent the station's call letters, the instructor notes the length of the perforated part of the strip and compares it with the various step diameters of the drum. The strip is applied to that particular drum step that can sweep the perforated part of the strip in approximately 90 degrees of rotation. Having chosen the drum step, the instructor simply inserts the strip, last letter first, into the space that forms an arcuate slot between the respective drum step and the corresponding arcuate contact 39 until the strip abuts a stop member 43, Fig. 5, at the lower end of the arcuate contact. The strip in this position is held snugly between the drum and fixed contact so that as the drum rotates counterclockwise, the brushes 36 and 37 sweep the strip in succession to control the signal circuit above described.

Referring to Fig. 6, the relationship of the keyer and other contacts to circuits of the radio range simulating apparatus 50 is generally indicated. The students' headphones are indicated at 51. The various oscillator and attenuating circuits for controlling the A and N signals, etc., form no part of the present invention and are not illustrated in view of the disclosure thereof in my Patent No. 2,366,603 above referred to. It is sufficient to state that two of the cams 20 control circuit transfer connections involving the A and N range signals and the station identification signals as hereinafter described. In addition, one of the cams eliminates the "keying clicks" that may be present during the transfer operations. The cams 11 perform various functions, one cam controlling the A and N letter coding and others as indicated controlling the coding of the usual fan marker and instrument landing signals.

The identification keyer 4 is electrically connected to the "identification range selector" switch and to the "range identification transfer" switch in the following manner: a joint connection 52 from the movable brush contacts of the drum 25 is connected to the cam-actuated contact 21*a* of the "identification range selector" switch and each of the fixed arcuate contacts 39 is adapted to be selectively connected through a "station selector" switch 53 and conductor 54 to a back contact 21*b* of the "range identification transfer" switch. This latter switch transfers the signal circuit from the "radio range signal control" between the A–N keying cam 11 and the "station identification keyer" 4 and insures the transmission of the station identification call signals to the students' headphones for the required period of about 7½ seconds. The "identification range selector" switch transmits the first signal in the A quadrant and the second signal in the N quadrant through the volume controlling potentiometers of the signal controller as described in my aforesaid patent.

As the four drum steps can usually accommodate strips representing at least two different stations, cross-country navigation problems are easily set up since the instructor has but to move the switch 53 to the particular range station that is being used in the navigation problem.

The specific contact scanning arrangement herein shown is by way of example only and other scanning devices may readily be used in practicing the invention, such as photoelectric scanning apparatus, for example. In the latter case, the rotatable drum may be slotted and hollow to enclose a light source so that the perforated strip is swept or scanned by a light beam from a drum slot as the drum rotates. Photoelectric means positioned behind the strip is energized by the interrupted light beam according to the length of the dots and dashes in the perforated strip for controlling in well known manner the signal circuit. The code signal length is proportioned to the fixed transmission interval in the same manner as that disclosed, namely, by positioning the perforated strip to be scanned on one of several different diameter supports variably spaced from the axis of the drum, the diameter selected depending on the extent of the signal characters so that the signal characters in each instance are scanned at constant angular velocity for a fixed interval.

Thus, there is provided by the present invention simplified and readily available means for simulating an indefinite number of radio range station signals while retaining all the advantages of clear, accurate and distinct transmission of signals to the student.

It should be understood that this invention is not limited to specific details of construction and arrangement thereof herein illustrated, and that changes and modifications may occur to one skilled in the art without departing from the spirit of the invention.

What is claimed is:

1. In training apparatus having means for simulating radio range signals, keyer apparatus for representing the identification signals of a respective radio range station comprising a rotatable member, a pair of spaced contacts mounted on said member and adapted to be connected to a signal circuit terminal, a relatively fixed arcuate contact member adapted to be engaged in wiping contact in succession by said rotatable contacts and connected to another signal circuit terminal, and an insulating perforated member adapted to be held in fixed position between said movable and fixed contacts, the perforations of said member representing dot-and-dash code signals and being in alignment with said rotatable contacts whereby electrical contact between the relatively fixed and movable contacts is controlled through said perforations.

2. In training apparatus having means for simulating radio range signals, keyer apparatus for representing the identification signals of a respective radio range station comprising a rotatable, cylindrical member, a pair of contacts mounted in peripherally spaced relation on said member and adapted to be connected to a signal circuit terminal, a relatively fixed arcuate contact member concentrically disposed with respect to said cylindrical member adapted to be engaged in wiping contact in succession by said rotatable contacts and connected to another signal circuit terminal, and a flexible insulating perforated strip adapted to be inserted and held in fixed position between said cylindrical member and arcuate contact, the perforations of said strip representing code signals and being in alignment with said rotatable contacts whereby electrical contact between the relatively fixed and movable contacts is controlled through said perforations.

3. In training apparatus having means for simulating radio range signals, keyer apparatus for representing the identification signals of one or more respective radio range stations comprising a rotatable drum member having a plurality of step portions of different diameters, a pair of contacts mounted in peripherally spaced relation on each step portion and adapted to be connected to a signal circuit terminal, a relatively fixed arcuate contact member for each step portion concentrically disposed with respect thereto and adapted to be engaged in wiping contact in succession by the respective step contacts, said fixed contacts adapted to be selectively connected to another signal circuit terminal, and an insulating perforated member adapted to be selectively positioned between respective arcuate and step contacts, the perforations of said member representing code signals and being in alignment with the respective step contacts whereby electrical contact between the relatively fixed and movable contacts is controlled through said perforations.

4. In training apparatus having means for simulating radio range signals, keyer apparatus for representing radio station identification signals comprising a motor-driven drum member, said drum member having a plurality of step portions of decreasing diameter along the axis of rotation of the drum, a relatively fixed arcuate contact disposed along the periphery of each step portion in closely spaced relation thereto, a brush contact mounted on each step portion for wiping engagement with the respective arcuate contact arranged so that all the brush contacts sweep the respective arcuate contacts concurrently, and an insulating perforated strip adapted to be selectively inserted in one of the arcuate spaces formed between the drum steps and respective arcuate contacts, the perforations of said strip representing code signals and being in alignment with the respective brush contacts whereby electrical contact between a brush contact and its corresponding arcuate contact is controlled through said perforations.

5. In training apparatus having means for simulating radio range signals, keyer apparatus for representing the identification signals of a respective radio range station comprising a rotatable drum member, a pair of spaced contacts mounted on the periphery of said member in angularly spaced relation and adapted to be connected to a signal circuit terminal, a relatively fixed arcuate contact member adapted to be engaged in wiping contact in succession by said rotatable contacts and connected to another signal circuit terminal, and a perforated paper strip adapted to be held in fixed position between said movable and arcuate contacts, the perforations of said strip representing code signals and being in alignment with said rotatable contacts whereby electrical contact between the relatively fixed and movable contacts is controlled through said perforations for simulating two transmissions of the station signals.

6. In training apparatus having means for simulating radio range signals, keyer apparatus for representing the identification signals of a respective radio range station comprising a rotatable member, means having code characters designating the call letters of said station, arcuate means having different radii concentrically of the axis of said rotatable member for supporting said code means at a radius location depending on the total length of the code characters, and means associated with said rotatable member for scanning said code means through a predetermined angle at constant angular velocity defining the identification signal transmission period for proportioning the length of the identification signal to said transmission period.

7. In training apparatus having means for simulating radio range signals, keyer apparatus for representing the identification signals of a respective radio range station comprising a rotatable member, perforated means defining code characters designating the call letters of said station, arcuate means having different radii for selectively supporting said perforated means according to the total length of the code characters, and means operable by said rotatable member for scanning said perforated means through a predetermined angle at constant angular velocity defining the identification signal transmission period for proportioning the length of the identification signal to said transmission period.

8. In training apparatus having means for simulating radio range signals, keyer apparatus for representing the identification signals of a respective radio range station comprising a rotatable member, a perforated strip defining code characters designating the call letters of said station, a plurality of arcuate supports of different radii concentric with respect to the axis of said rotatable member for positioning said strip at a radius location depending on the total length of the code characters, and means operable by said rotatable member for scanning said strip through a predetermined angle at constant angular velocity defining the identification signal transmission period for proportioning the length of the identification signal to said transmission period.

9. In training apparatus having means for simulating radio range signals in a multiple quadrant range, keyer apparatus for representing the identification signals of a respective radio range station comprising a rotatable member operable at constant speed, means perforated linearly to define code characters designating the call letters of said station, a plurality of arcuate means each having a different radius and arranged concentrically of the axis of said rotatable member for supporting said code means at a radius location depending on the total length of the code perforations, and a pair of means operable by said rotatable member for scanning in succession said code means through a predetermined angle at constant angular velocity defining the identification signal transmission period.

10. In training apparatus having means for simulating radio range signals, keyer apparatus for representing the identification signals of a respective radio range station comprising a rotatable member operable at constant speed, a tape perforated to define code characters designating the call letters of said station, a plurality of arcuate supports each having a different radius concentric of the axis of said rotatable member for supporting said tape at a radius location depending on the total length of the code perforations, electric contact means associated with both said rotatable member and said supports for scanning said tape through a predetermined angle at constant angular velocity defining the identification signal transmission period for proportioning the length of the identification signal to said receiver and controlled by said electric contact means for simulating transmission of the station identification signals.

11. In training apparatus having means for simulating radio range signals, keyer apparatus for representing the identification signals of a respective radio range station comprising angular scanning means, a strip having code characters designating the call letters of said station, and individual means disposed at radially spaced positions and subtended by a predetermined scanning angle for selectively supporting said strip according to the total length of the code characters, said scanning means being adapted to scan said strip through said predetermined angle at constant angular velocity defining the identification signal transmission period for proportioning the length of the identification signal to said transmission period.

12. In training apparatus having means for simulating radio range signals, keyer apparatus for representing the identification signals of a respective radio range station comprising angular scanning means, perforated means defining code characters designating the call letters of said station, and means subtended by a predetermined scanning angle for selectively supporting said perforated means at radially spaced intervals according to the total length of the code characters, said scanning means being adapted to scan said perforated means through said predetermined angle at constant angular velocity defining the identification signal transmission period for proportioning the length of the identification signal to said transmission period.

RICHARD C. DEHMEL.

References Cited in the file of this patent

UNITED STATES PATENTS

| Number | Name | Date |
|---|---|---|
| 683,171 | Comins | Sept. 24, 1901 |
| 1,119,371 | Reilly | Dec. 1, 1914 |
| 1,725,145 | Kirkpatrick | Aug. 20, 1929 |
| 1,802,643 | Floyd | Apr. 28, 1931 |
| 1,913,905 | Servanton | June 13, 1933 |
| 1,985,640 | Kitchens | Dec. 25, 1934 |
| 2,110,869 | Crane | Mar. 15, 1938 |
| 2,312,962 | De Florez | Mar. 2, 1943 |
| 2,358,498 | Espeseth | Sept. 19, 1944 |
| 2,359,294 | Blenman | Oct. 3, 1944 |
| 2,366,603 | Dehmel | Jan. 2, 1945 |
| 2,430,371 | Smith | Nov. 4, 1947 |
| 2,435,502 | Lang | Feb. 3, 1948 |
| 2,441,136 | Charles | May 11, 1948 |
| 2,465,165 | McLaughlin | Mar. 22, 1949 |
| 2,592,779 | Wise et al. | Apr. 15, 1952 |